(12) United States Patent
Cirulli et al.

(10) Patent No.: US 8,589,275 B2
(45) Date of Patent: Nov. 19, 2013

(54) SYSTEM AND METHOD FOR PROCESSING TAX CODES BY COMPANY GROUP

(75) Inventors: Susan Bumgardner Cirulli, Endicott, NY (US); Robert Martin Evans, Binghamton, NY (US)

(73) Assignee: Ebay Inc., San Jose, CA (US)

(*) Notice: Subject to any disclaimer, the term of this patent is extended or adjusted under 35 U.S.C. 154(b) by 728 days.

(21) Appl. No.: 11/983,111

(22) Filed: Nov. 6, 2007

(65) Prior Publication Data
US 2008/0071653 A1    Mar. 20, 2008

Related U.S. Application Data

(63) Continuation of application No. 09/816,264, filed on Mar. 23, 2001, now Pat. No. 7,386,495.

(51) Int. Cl.
G06Q 40/00    (2012.01)

(52) U.S. Cl.
USPC ............................. 705/36 R; 705/36 T; 705/38

(58) Field of Classification Search
USPC ................................................ 705/36 T, 36 R
See application file for complete search history.

(56) References Cited

U.S. PATENT DOCUMENTS

| | | |
|---|---|---|
| 4,799,156 A | 1/1989 | Shavit et al. |
| 4,947,028 A | 8/1990 | Gorog |
| 5,021,953 A | 6/1991 | Webber et al. |
| 5,117,356 A | 5/1992 | Marks |
| 5,168,444 A | 12/1992 | Cukor et al. |
| 5,189,608 A | 2/1993 | Lyons et al. |
| 5,319,542 A | 6/1994 | King, Jr. et al. |
| 5,335,169 A * | 8/1994 | Chong ............................ 705/31 |
| 5,361,393 A | 11/1994 | Rossillo |
| 5,390,113 A | 2/1995 | Sampson |
| 5,544,298 A | 8/1996 | Kanavy et al. |
| 5,640,550 A | 6/1997 | Coker |
| 5,666,493 A | 9/1997 | Wojcik et al. |
| 5,694,551 A | 12/1997 | Doyle et al. |
| 5,712,989 A | 1/1998 | Johnson et al. |
| 5,715,453 A | 2/1998 | Stewart |

(Continued)

FOREIGN PATENT DOCUMENTS

| | | |
|---|---|---|
| GB | 2082814 A | 3/1982 |
| WO | WO9849639 A1 | 11/1998 |

OTHER PUBLICATIONS

USBI bill dated Jul. 22, 1998, two web site pages with background on USBI (www.billview.com and www.billing concepts.com).
Notice of Allowance (Mail Date Jul. 12, 2010) for U.S. Appl. No. 11/973,936, filed Oct. 11, 2007.
Notice of Allowance (Mail Date Jul. 22, 2010) for U.S. Appl. No. 11/638,276, filed Dec. 13, 2006.
Notice of Allowance (Mail Date Jul. 12, 2010) for U.S. Appl. No. 11/999,109, filed Dec. 4, 2007.

(Continued)

Primary Examiner — Kristen Apple
(74) Attorney, Agent, or Firm — Haynes and Boone, LLP

(57) ABSTRACT

A system and method for assigning taxability codes to purchases, and processing tax invoices, by company groups. A user, identified to one of a group of companies, inputs a requisition. Tax code and tax location are identified in a front end process applicable to the object of the requisition and converted into a converted tax code and tax jurisdiction and fed to a back end processor. Responsive to converted tax code and the tax jurisdiction for the corresponding company group, the back end prepares a purchase order which is transmitted to a supplier. Responsive to an invoice from the supplier and company group and tax code indicia from the purchase order, the back end processes and selectively pays, short pays, or rejects the invoice.

24 Claims, 14 Drawing Sheets

(56) References Cited

U.S. PATENT DOCUMENTS

| | | |
|---|---|---|
| 5,721,832 A | 2/1998 | Westrope et al. |
| 5,737,592 A | 4/1998 | Nguyen et al. |
| 5,758,327 A | 5/1998 | Gardner et al. |
| 5,758,351 A | 5/1998 | Gibson et al. |
| 5,781,908 A | 7/1998 | Williams et al. |
| 5,794,207 A | 8/1998 | Walker et al. |
| 5,799,151 A | 8/1998 | Hoffer |
| 5,802,518 A | 9/1998 | Karaev et al. |
| 5,815,829 A | 9/1998 | Zargar |
| 5,838,906 A | 11/1998 | Doyle et al. |
| 5,838,916 A | 11/1998 | Domenikos et al. |
| 5,870,717 A | 2/1999 | Wiecha |
| 5,918,017 A | 6/1999 | Attanasio et al. |
| 5,963,922 A | 10/1999 | Helmering |
| 5,963,925 A | 10/1999 | Kolling et al. |
| 5,970,475 A | 10/1999 | Barnes et al. |
| 5,974,407 A | 10/1999 | Sacks |
| 6,003,039 A | 12/1999 | Barry et al. |
| 6,006,204 A | 12/1999 | Malcolm |
| 6,014,134 A | 1/2000 | Bell et al. |
| 6,016,394 A | 1/2000 | Walker |
| 6,023,683 A | 2/2000 | Johnson et al. |
| 6,023,729 A | 2/2000 | Samuel et al. |
| 6,029,150 A | 2/2000 | Kravitz |
| 6,032,130 A | 2/2000 | Alloul et al. |
| 6,032,145 A | 2/2000 | Beall et al. |
| 6,032,150 A | 2/2000 | Nguyen |
| 6,047,268 A * | 4/2000 | Bartoli et al. ............... 705/35 |
| 6,052,785 A | 4/2000 | Lin et al. |
| 6,055,516 A | 4/2000 | Johnson et al. |
| 6,055,519 A | 4/2000 | Kennedy et al. |
| 6,058,373 A | 5/2000 | Blinn et al. |
| 6,058,380 A | 5/2000 | Anderson et al. |
| 6,058,381 A | 5/2000 | Nelson |
| 6,064,977 A | 5/2000 | Haverstock et al. |
| 6,094,654 A | 7/2000 | Van Huben et al. |
| 6,104,717 A | 8/2000 | Coile et al. |
| 6,112,242 A | 8/2000 | Jois et al. |
| 6,115,690 A | 9/2000 | Wong |
| 6,125,363 A | 9/2000 | Buzzeo et al. |
| 6,128,602 A | 10/2000 | Northington et al. |
| 6,144,991 A | 11/2000 | England |
| 6,151,608 A | 11/2000 | Abrams |
| 6,163,805 A | 12/2000 | Silva et al. |
| 6,185,545 B1 | 2/2001 | Resnick et al. |
| 6,199,113 B1 | 3/2001 | Alegre et al. |
| 6,208,345 B1 | 3/2001 | Sheard et al. |
| 6,219,680 B1 | 4/2001 | Bernardo et al. |
| 6,239,797 B1 | 5/2001 | Hills et al. |
| 6,240,399 B1 * | 5/2001 | Frank et al. ............. 705/36 R |
| 6,260,024 B1 | 7/2001 | Shkedy |
| 6,269,343 B1 | 7/2001 | Pallakoff |
| 6,314,408 B1 | 11/2001 | Salas et al. |
| 6,317,751 B1 | 11/2001 | Yeger et al. |
| 6,330,575 B1 | 12/2001 | Moore et al. |
| 6,336,114 B1 | 1/2002 | Garrison |
| 6,343,284 B1 | 1/2002 | Ishikawa et al. |
| 6,343,287 B1 | 1/2002 | Kumar et al. |
| 6,356,283 B1 | 3/2002 | Guedalia |
| 6,360,211 B1 | 3/2002 | Anderson et al. |
| 6,381,644 B2 | 4/2002 | Munguia et al. |
| 6,401,120 B1 | 6/2002 | Gamache et al. |
| 6,418,415 B1 | 7/2002 | Walker et al. |
| 6,418,420 B1 | 7/2002 | DiGiorgio et al. |
| 6,418,467 B1 | 7/2002 | Schweitzer et al. |
| 6,430,538 B1 | 8/2002 | Bacon et al. |
| 6,449,744 B1 | 9/2002 | Hansen |
| 6,452,609 B1 | 9/2002 | Katinsky et al. |
| 6,453,353 B1 | 9/2002 | Win et al. |
| 6,460,041 B2 | 10/2002 | Lloyd |
| 6,466,949 B2 | 10/2002 | Yang et al. |
| 6,466,980 B1 | 10/2002 | Lumelsky et al. |
| 6,477,510 B1 | 11/2002 | Johnson |
| 6,486,891 B1 | 11/2002 | Rice |
| 6,499,036 B1 | 12/2002 | Gurevich |
| 6,507,826 B1 | 1/2003 | Maners |
| 6,516,327 B1 | 2/2003 | Zondervan et al. |
| 6,523,027 B1 | 2/2003 | Underwood |
| 6,535,294 B1 | 3/2003 | Arledge, Jr. et al. |
| 6,539,396 B1 | 3/2003 | Bowman-Amuah |
| 6,578,068 B1 | 6/2003 | Bowman-Amuah |
| 6,589,290 B1 | 7/2003 | Maxwell et al. |
| 6,594,819 B1 | 7/2003 | Ciarlante et al. |
| 6,601,084 B1 | 7/2003 | Bhaskaran et al. |
| 6,606,643 B1 | 8/2003 | Emens et al. |
| 6,611,822 B1 | 8/2003 | Beams et al. |
| 6,631,382 B1 | 10/2003 | Kouchi et al. |
| 6,631,402 B1 | 10/2003 | Devine et al. |
| 6,643,690 B2 | 11/2003 | Duursma et al. |
| 6,668,253 B1 | 12/2003 | Thompson et al. |
| 6,681,229 B1 | 1/2004 | Cason et al. |
| 6,684,384 B1 | 1/2004 | Bickerton et al. |
| 6,686,932 B2 | 2/2004 | Rath et al. |
| 6,687,731 B1 | 2/2004 | Kavak |
| 6,704,612 B1 | 3/2004 | Hahn-Carlson |
| 6,725,264 B1 | 4/2004 | Christy |
| 6,760,775 B1 | 7/2004 | Anerousis et al. |
| 6,772,167 B1 | 8/2004 | Snavely et al. |
| 6,785,822 B1 | 8/2004 | Sadhwani-Tully |
| 6,801,949 B1 | 10/2004 | Bruck et al. |
| 6,826,542 B1 | 11/2004 | Virgin et al. |
| 6,834,294 B1 | 12/2004 | Katz |
| 6,839,680 B1 | 1/2005 | Liu et al. |
| 6,847,953 B2 | 1/2005 | Kuo |
| 6,853,630 B1 | 2/2005 | Manning |
| 6,882,983 B2 | 4/2005 | Furphy et al. |
| 6,886,134 B1 | 4/2005 | Cason |
| 6,922,671 B2 | 7/2005 | Musa et al. |
| 6,928,411 B1 | 8/2005 | Fox et al. |
| 6,934,690 B1 | 8/2005 | Van Horn et al. |
| 6,947,063 B1 | 9/2005 | Cirulli et al. |
| 6,950,983 B1 | 9/2005 | Snavely |
| 6,965,938 B1 | 11/2005 | Beasley et al. |
| 6,971,107 B2 | 11/2005 | Sjostrom et al. |
| 7,003,474 B2 | 2/2006 | Lidow |
| 7,133,868 B1 | 11/2006 | Ruest et al. |
| 7,155,403 B2 | 12/2006 | Cirulli et al. |
| 7,171,374 B1 | 1/2007 | Sheehan et al. |
| 7,197,480 B1 | 3/2007 | Chollon et al. |
| 7,243,077 B2 | 7/2007 | Broden et al. |
| 7,266,503 B2 | 9/2007 | Cason et al. |
| 7,283,976 B2 | 10/2007 | Aber et al. |
| 7,349,879 B2 | 3/2008 | Alsberg et al. |
| 7,356,496 B2 | 4/2008 | Kane et al. |
| 7,363,246 B1 | 4/2008 | Van Horn et al. |
| 7,386,495 B2 | 6/2008 | Cirulli et al. |
| 7,835,956 B2 | 11/2010 | Aber et al. |
| 7,848,970 B2 | 12/2010 | Kane et al. |
| 7,895,095 B2 | 2/2011 | Chollon et al. |
| 7,983,958 B2 | 7/2011 | Broden et al. |
| 8,027,892 B2 | 9/2011 | Baumann et al. |
| 8,229,814 B2 | 7/2012 | Baumann et al. |
| 2001/0011222 A1 | 8/2001 | McLauchlin et al. |
| 2001/0032162 A1 | 10/2001 | Alsberg et al. |
| 2001/0051913 A1 | 12/2001 | Vashistha et al. |
| 2002/0019740 A1 | 2/2002 | Matsuo et al. |
| 2002/0055878 A1 | 5/2002 | Burton et al. |
| 2002/0065736 A1 | 5/2002 | Willner et al. |
| 2002/0065885 A1 | 5/2002 | Buonanno et al. |
| 2002/0087441 A1 | 7/2002 | Wagner, Jr. et al. |
| 2002/0091597 A1 | 7/2002 | Teng |
| 2002/0093538 A1 | 7/2002 | Carlin |
| 2002/0103731 A1 | 8/2002 | Barnard et al. |
| 2002/0107890 A1 | 8/2002 | Gao et al. |
| 2002/0128944 A1 | 9/2002 | Crabtree et al. |
| 2002/0138281 A1 | 9/2002 | Cirulli et al. |
| 2002/0138658 A1 | 9/2002 | Sjostrom et al. |
| 2002/0143699 A1 | 10/2002 | Baumann et al. |
| 2002/0161606 A1 | 10/2002 | Bennett et al. |
| 2002/0161667 A1 | 10/2002 | Felkey et al. |
| 2002/0184111 A1 | 12/2002 | Swanson |
| 2002/0184125 A1 | 12/2002 | Cirulli et al. |
| 2003/0074580 A1 | 4/2003 | Knouse et al. |
| 2003/0093320 A1 * | 5/2003 | Sullivan ............... 705/19 |

(56) References Cited

U.S. PATENT DOCUMENTS

| | | | |
|---|---|---|---|
| 2003/0139996 | A1 | 7/2003 | D'Antoni et al. |
| 2003/0187688 | A1 | 10/2003 | Fey et al. |
| 2003/0220875 | A1 | 11/2003 | Lam et al. |
| 2004/0015367 | A1 | 1/2004 | Nicastro et al. |
| 2004/0078275 | A1 | 4/2004 | Ismert et al. |
| 2005/0097016 | A1 | 5/2005 | Barnard et al. |
| 2007/0179894 | A1 | 8/2007 | Cirulli et al. |

OTHER PUBLICATIONS

Lotus Development Corp., an IBM Subsidiary. Lotus Domino: Application Development with Domino Designer, Rel. 5. USA, privately printed, 1998. i-vii, 425-430.

Lotus Development Corp., an IBM Subsidiary. Lotus Domino: Domino Enterprise Integration Guide, Rel. 5. USA, privately printed, 1998. 9-20, 107-122, 444-451.

Berners-Lee et al.; "Uniform Resource Locators (URL)"; Request for Comments (RFC) 1738; Dec. 1994. (as cited on PTO-892 of related U.S. Appl. No. 09/657,215, now Patent 6,965,938 issued Nov. 15, 2005).

Brown et al.; "Mastering Lotus Notes"; pp. 6-15, 486-483; ISBM 0782113028; 1995. (as cited on PTO-892 of related U.S. Appl. No. 09/657,215, now Patent 6,965,938 issued Nov. 15, 2005).

Tewari et al.; "High Availability in Clustered Multimedia Servers"; Proceedings of the Twelfth International Conference on Data Engineering; pp. 645-654; Feb. 1996. (as cited on PTO-892 of related U.S. Appl. No. 09/657,215, now Patent 6,965,938 issued Nov. 15, 2005).

Cardellini et al.; "Redirection algorthims for load sharing in distributed Web-server systems"; Proceedings. 19th IEEE International Conference on Distributed Computing Systems; pp. 528-535; May 1999. (as cited on PTO-892 of related U.S. Appl. No. 09/657,215, now Patent 6,965,938 issued Nov. 15, 2005).

John D'Esposito. Proxy Pass Implementation in GWA. Undated. 13 pages. Published before Sep. 6, 2000 on the Internet at <htt;://w3.ibm.com/media/juke/presenter/gwa/proxy/proxy.html>. (as cited on related U.S. Appl. No. 09/657,217, now Patent 6,947,063 issued Sep. 20, 2005).

Sun Microsystems, Inc. Java 2 Enterprise Edition Technical Documentation. Copyright 1999. 1 page. (cited on related U.S. Appl. No. 09/656,803, now Patent 6,772,167 issued Aug. 3, 2004).

Sun Microsystems, Inc. Java 2 Enterprise Edition Developer's Guide. Copyright 1999. Table of Contents (7 pages) and Chapter 8 "Security" (10 pages). (cited on related U.S. Appl. No. 09/656,803, now Patent 6,772,167 issued Aug. 3, 2004).

Dynamic HTML in Action Written by William J. Pardi and Eric Schurman, 1998 (as cited on PTO-892 of related U.S. Appl. No. 09/819,462, now Patent 6,886,134 issued Apr. 26, 2005).

Gershenfeld, Nancy; "Client-server: What Is It and Are We There Yet?" Online. Medford: Mar. 1995. vol. 19, Iss. 2; p. 60, 6 pages. (as cited on PTO-892 of related U.S. Appl. No. 09/819,462).

University of New Hampshire Financial and Administrative Procedures, 1994, 11 pages. (as cited on PTO-892 of related U.S. Appl. No. 09/819,462).

Minnesota Statewide Administrative Systems webpage describing three way match, Jun. 29, 1995, 1 page. (as cited on PTO-892 of related U.S. Appl. No. 09/819,462).

US Dept. of Energy, I-MANAGE STARS Functional and Technical Requirements, Sep. 2000, 54 pages. (as cited on PTO-892 of related U.S. Appl. No. 09/819,462).

X12 Transaction Set Index Vesion 3040, undated, 4 pages. (as cited on PTO-892 of related U.S. Appl. No. 09/819,462)

All Open Orders for Customer, Nov. 23, 1999, Motorola. (as cited on Patent 6,922,671 issued Jul. 26, 2005 for related case [U.S. Appl. No. 09/815,320]).

Elaine Marmel and Diane Koers, Peachtree 8 for Dummies, © 2000, Hungry Minds, Inc. (as cited on Patent 6,922,671 issued Jul. 26, 2005 for related case [U.S. Appl. No. 09/815,320]).

David Kroenke, Database Processing, © 1983, 1977, Science Research Associates, Inc.

Deitel & Deitel, Java How to Program, © 1998, 1997, Prentice-Hall. (as cited on Patent 6,922,671 issued Jul. 26, 2005 for related case [U.S. Appl. No. 09/815,320]).

State of Texas Statewide Electronic Commerce Feasibility Study; May 15, 1998; Phoenix Planning & Evaluation, Ltd. Rockville, MD 20852.x. (as cited on Patent 6,922,671 issued Jul. 26, 2005 for related case [U.S. Appl. No. 09/815,320]).

Yehuda Shiran; Sharing functions between frames, Jul. 29, 2000, (as cited on PTO-892 of related U.S. Appl. No. 09/815,316, now Patent 6,971,107 issued Nov. 29, 2005).

JavaScrip and Frames Part II—The Famous Memory Game, Apr. 5, 1999. (as cited on PTO-892 of related U.S. Appl. No. 09/815,316, now Patent 6,971,107 issued Nov. 29, 2005).

Tom Negrino, JavaScript for the World Wide Web: Visual QuickStar Guide (3rd Edition), 2000. (as cited on PTO-892 of related U.S. Appl. No. 09/815,316, now Patent 6,971,107 issued Nov. 29, 2005).

Baron et al.; "Web-based E-catalog systems inB2B procurement", Association for Computing Machinery, May 2000, vol. 43 No. 5, p. 93+. (as cited on PTO-892 of related U.S. Appl. No. 09/815,313, now Patent 7,283,976 issued Oct. 16, 2007).

van Riel et al.; "Exploring consumer evaluations of e-services: a portal site", International Journal of Service Industry Management, 2001, vol. 12 No. 3, p. 359+. (as cited on PTO-892 of related U.S. Appl. No. 09/815,313, now Patent 7,283,976 issued Oct. 16, 2007).

"IBM and MarketMile Forge e-business on Demand Alliance". Business Editors/High-Tech Writers. Business Wire. Feb. 19, 2002. [recovered from Dialog database Jul. 2, 2007]. (as cited on PTO-892 of related U.S. Appl. No. 09/798,598, now Patent 7,243,077 issued Jul. 10, 2007).

"Supply Side e-conomics". Duey, Rhonda. Oil and Gas Investor. May 2000 [recovered from DIALOG database Jul. 2, 2007]. (as cited on PTO-892 of related U.S. Appl. No. 09/798,598, now Patent 7,243,077 issued Jul. 10, 2007).

Lisa Valentine. "Banks' accounting systems showing their age." Bank Technology News Nov. 1, 1998: Banking Information Source, ProQuest. Web. Jul. 13, 2010. (as cited on PTO-892 of related U.S. Appl. No. 11/999,109).

Notice of Allowance (Mail Date Mar. 9, 2012) for U.S. Appl. No. 13/198,755, filed Aug. 5, 2011.

Office Action (Mail Date Apr. 3, 2012) for U.S. Appl. No. 13/184,682, filed Jul. 18, 2011.

Notice of Allowance (Mail Date May 20, 2011) for U.S. Appl. No. 09/819,462, filed Mar. 28, 2001.

Notice of Allowance (Mail Date Mar. 3, 2011) for U.S. Appl. No. 11/807,324, filed May 25, 2007.

Amendment filed Jul. 2, 2012 in response to Office Action (Mail Date Apr. 3, 2012) for U.S. Appl. No. 13/184,682, filed Jul. 18, 2011.

Notice of Allowance (Mail Date Aug. 6, 2012) for U.S. Appl. No. 13/184,682, filed Jul. 18, 2011.

Office Action (Mail Date Sep. 21, 2012) for U.S. Appl. No. 11/643,193, filed Dec. 21, 2006.

Office Action (Mail Date Oct. 8, 2010) for U.S. Appl. No. 11/807,324, filed May 25, 2007.

Office Action (Mail Date Sep. 21, 2011) for U.S. Appl. No. 13/198,755, filed Aug. 5, 2011.

U.S. Appl. No. 13/198,755, filed Aug. 5, 2011.

U.S. Appl. No. 13/184,682, filed Jul. 18, 2011.

www.demandline.com Dated Feb. 26, 2000 to Oct. 31, 2000. [Recovered from www.Archive.org] on PTO Form 892 for U.S. Appl. No. 11/807,324 (recently patented 7,983,958).

Office Action (Mail Date Mar. 30, 2009) for U.S. Appl. No. 09/819,462, filed Mar. 28, 2001, First Named Inventor Carl Steven Baumann.

Office Action (Mail Date Jun. 8, 2010) for U.S. Appl. No. 11/643,193, filed Dec. 21, 2006, First Named Inventor Susan Bumgardner Cirulli.

Office Action (Mail Date Mar. 18, 2010) for U.S. Appl. No. 11/643,193, filed Dec. 21, 2006, First Named Inventor Susan Bumgardner Cirulli.

Office Action (Mail Date Mar. 2, 2010) for U.S. Appl. No. 11/643,193, filed Dec. 21, 2006, First Named Inventor Susan Bumgardner Cirulli.

* cited by examiner

| ITEM OPTIONS | |
|---|---|
| TAX INFORMATION | Non-Taxable – Resale ▼ |
| * Tax Indicator Code: | |
| * Tax Location code: | TN(44DA)-651 Heil-Quaker ▼<br>Ave. – Lewisburg |
| ITEM OPTIONS | |
| * Need By | 3/23/2001 |
| * Expedite/Emergency | NO ▼ |

FIG. 8

| ITEM OPTIONS | |
|---|---|
| TAX INFORMATION<br>* Tax Indicator Code | Taxable ▼ |
| | Taxable |
| | Taxable Reduced Rate Mach/<br>Equip NC Only |
| | Nontaxable− Resale |
| | Nontaxable− Manufacturing |
| | Nontaxable− Research and<br>Development |
| | Nontaxable− Capital<br>Improvement |
| | Nontaxable− Service |
| | Nontaxable− Other |

FIG. 9

| ITEM OPTIONS | |
|---|---|
| TAX INFORMATION<br>　＊ Tax Location Code | TN (44DA)-651 Heil-Quaker Ave. - Lewisburg ▼ |
| | -Select from list- |
| | TN(44DA)-651 Heil-Quaker Ave.-Lewisburg |
| | TN(44DB)1621 Heil-Quaker Ave.-Lavergne |

FIG. 10

```
CHANGE PURCHASE ORDER:  ITEM 00002
Purchase  Order  Edit  Header  Item  Environment  System  Help
Item         4600000695    Item Cat.    2      AcctAssCat   N
Material                   Mat'l Group  S09    Plant        CF01
Description  text                              Stor. Loc Qty and Price
    Order quantity     1          UL                 Info rec. update ☐
    Net Order Price    1,000.00   USD $   1   UL    ☐ Estimated Price
    Qty. Conversion    1          UL <->  1   UL    ✓ Print price Deadline Monitoring
    Delivery Date    T 01/12/2000     Reminder 1
    Stat. del. date    01/12/2000     Reminder 2
                                      Reminder 3

Acknow. no.
    Tracking no.     BOB
    ConfContrk                        ☐ Ackn. reqd.
    Vend. mat.

GR proc. Time

GR/IR control
    Underdel. tol.          %         ☐ Qual. insp.
    Overdel. tol.           %         ☐ Del. compl.
    Tax Code         I 1              ☐ Final inv.
    Shipping Inst
```

FIG. 11

```
ENTER INVOICE : INDIVIDUAL PURCHASE ORDER ITEM
```

LINE ITEM 002
AMOUNT        1,000.00   USD

TAX CODE        I 1
                              TAX  JURIS.CD.  331000000

ITEM DATA
    MATERIAL                    ACCT ASS CAT  N
    PLANT      CF01             ORDERED               1
    PURCH.DOC  4600000695       DELIVERED             0
               00002   01       INVOICED              0
    QUANTITY         1  UL      NET PRICE   1,000.00 USD 1 UL

CONTROL

SUB. DEB./CRED.  ☐

ALLOCATION  [       ]       MAN.BLOCK . REASN  ☐
                                FINAL INVOICE      ☐
    TEXT        [         ]

FIG. 13

SYSTEM AND METHOD FOR PROCESSING TAX CODES BY COMPANY GROUP

This application is a continuation of and claims priority to U.S. patent application Ser. No. 09/816,264 filed Mar. 23, 2001 now U.S. Pat. No. 7,386,495 by S. B. Cirulli, et al., entitled SYSTEM AND METHOD FOR PROCESSING TAX CODES BY COMPANY GROUP.

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation;

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend;

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar";

Ser. No. 09/819,462, entitled "SYSTEM AND METHOD FOR AUTOMATING INVOICE PROCESSING WITH POSITIVE CONFIRMATION";

Ser. No. 09/815,318, entitled "SYSTEM AND METHOD FOR GENERATING A COMPANY GROUP USER PROFILE";

Ser. No. 09/819,437, entitled "SYSTEM AND METHOD FOR SHARING DATA ACROSS FRAMES USING ENVIRONMENT VARIABLES";

Ser. No. 09/815,317, entitled "SYSTEM AND METHOD FOR SYNCHRONIZING LEDGER ACCOUNTS BY COMPANY GROUP";

Ser. No. 09/815,320, entitled "SYSTEM AND METHOD FOR GROUPING COMPANIES ACCORDING TO ACCOUNTING SYSTEM OR RULES";

Ser. No. 09/815,316, entitled "SYSTEM AND METHOD FOR FRAME STORAGE OF EXECUTABLE CODE";

Ser. No. 09/815,313, entitled "SYSTEM AND METHOD FOR INVOICE IMAGING THROUGH NEGATIVE CONFIRMATION PROCESS";

Ser. No. 09/815,312, entitled "SYSTEM AND METHOD FOR LEVERAGING PROCUREMENT ACROSS COMPANIES AND COMPANY GROUPS"; and Ser. No. 09/798,598, filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to a system and method for processing tax codes by company group in a front-end processor to bridge to a back-end purchasing system.

2. Background Art

When companies purchase goods, there are certain requirements for taxation. Taxation requirements differ by county, city, state, country and other locales, creating processing problems in paying those taxes correctly. Most companies use tax packages to determine taxability, based on where the goods are shipped; however, this does not take into account items that are purchased for research purposes or government contracts, which are not taxable. In certain companies, the people ordering the goods know the taxability and the shipping information, and can determine the taxability at the time of the order, but they are not usually the ones who interface with the tax packages; this is usually left to the Accounts Payable area.

There is a need in the art to provide an automated process for assigning taxability codes to purchases by company groups, and to automatically adapt to those company groups the processing of tax payments.

There is a further need to provide in a front end for the assignment of taxability codes, to thereby reduce the amount of work required on a back end process for resolving tax issues.

It is an object of the invention to provide an improved system and method for processing tax payments.

It is a further object of the invention to provide a system and method for assigning taxability codes to purchases by company groups, and to automatically adapt to those company groups the processing of tax payments.

SUMMARY OF THE INVENTION

In accordance with the invention, there is provided a system and method for assigning taxability codes to purchases and processing tax invoices, the method including the steps of receiving from a user, identified by company indicia to one of a plurality of company groups, a purchase requisition for a service or commodity object; responsive to the indicia and object, determining in a front end process a tax code and tax location based on defined business rules; feeding the tax code and tax location code to a back end process; in the back end process, converting the tax code and tax location to a tax jurisdiction code with associated tax rate and preparing a purchase order identified to the appropriate company group for transmittal.

In accordance with an aspect of the invention, there is provided a computer program product configured to be operable to assigning taxability codes to purchases, and processing tax invoices, by company groups.

Other features and advantages of this invention will become apparent from the following detailed description of the presently preferred embodiment of the invention, taken in conjunction with the accompanying drawings.

BRIEF DESCRIPTION OF THE DRAWINGS

FIG. 8 is a representation of a screen panel display for users required to select tax code and location.

FIG. 9 is a representation of a screen panel expansion of the tax indicator code of FIG. 8.

FIG. 10 is a representation of a screen panel expansion of the tax location code of FIG. 8.

FIG. 11 illustrates a purchase order detail screen which shows tax code I1 which is a taxable code.

FIG. 13 illustrates an invoice verification screen showing a I1 tax code and tax jurisdiction code of 331000000 which have defaulted from the purchase order.

BEST MODE FOR CARRYING OUT THE INVENTION

In accordance with the preferred embodiments of the invention, a system and method are provided for identifying specific tax jurisdiction codes and appropriate tax indicator codes by company groups, in a front-end procurement system to bridge to a back-end purchasing system for appropriate processing. This provides a system and method for automating the process of configuring tax processing across multiple companies and groups of associated companies.

Further in accordance with the invention, there is provided a system and method for assigning taxability codes to purchases, and processing tax invoices, by company groups at the time of placing the order. A user, identified to one of a group of companies, inputs a requisition. Depending upon the user's company group and business processes, the user may be required to select an appropriate tax code and tax location for the goods to be purchased, or have it assigned automatically. This capability is associated with individual line items, rather than the entire requisition. Certain companies may require the tax code to be assigned by a "tax approver," who reviews the requisition items and assigns tax codes as appropriate. Tax code and tax location are identified in a front end process applicable to the object of the requisition and converted into a converted tax code and tax jurisdiction and fed to a back end processor. Responsive to converted tax code and the tax jurisdiction for the corresponding company group, the back end prepares a purchase order which is transmitted to a supplier. Responsive to an invoice from the supplier and company group and tax code indicia from the purchase order, the back end processes and selectively pays, short pays, or rejects the invoice.

Referring to FIGS. 2 through 7, an exemplary embodiment illustrating three tax processing scenarios on behalf of three different company groups is presented. In the first scenario (FIGS. 2 and 3), a user creating a requisition is involved in selecting the taxability. In the second scenario (FIGS. 4 and 5), taxability is determined based on the commodity being purchased. And in the third scenario (FIGS. 6 and 7), taxability is determined based on the commodity being purchased and the purchasing ship to location. Which scenario is executed is determined by the company code assigned to the user creating the requisition.

Figure 1:
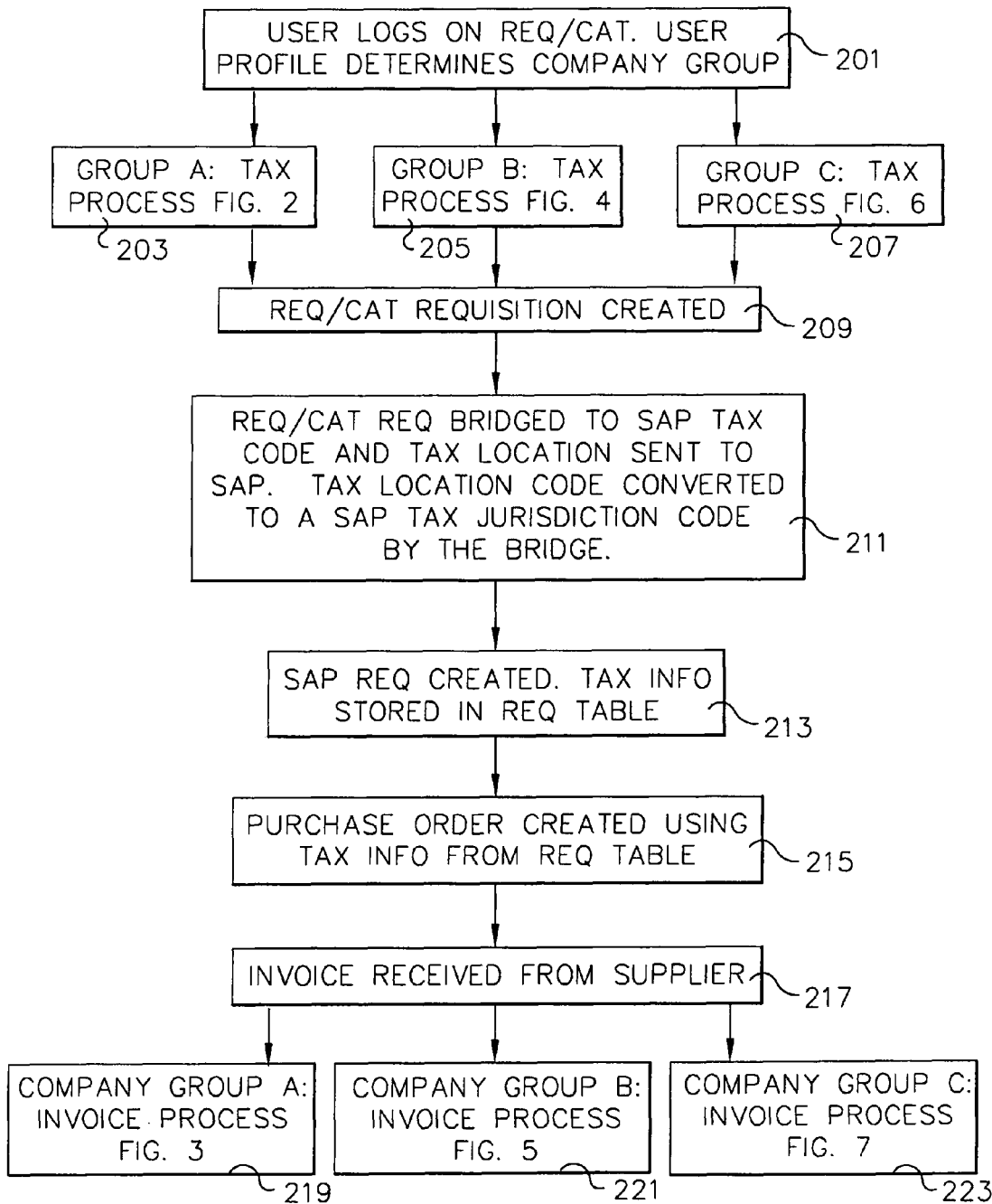
FIG. 1 is a high level system diagram illustrating taxability processing for a plurality of company groups in accordance with the preferred embodiment of the invention.

Referring to FIG. 1, a system and process flow diagram is provided which draws together in one overview the three systems illustrated in FIGS. 2-7.

In step 201, a user logs on to the Requisition and Catalog application (Req/Cat). His user profile determines the company group.

Figure 2:
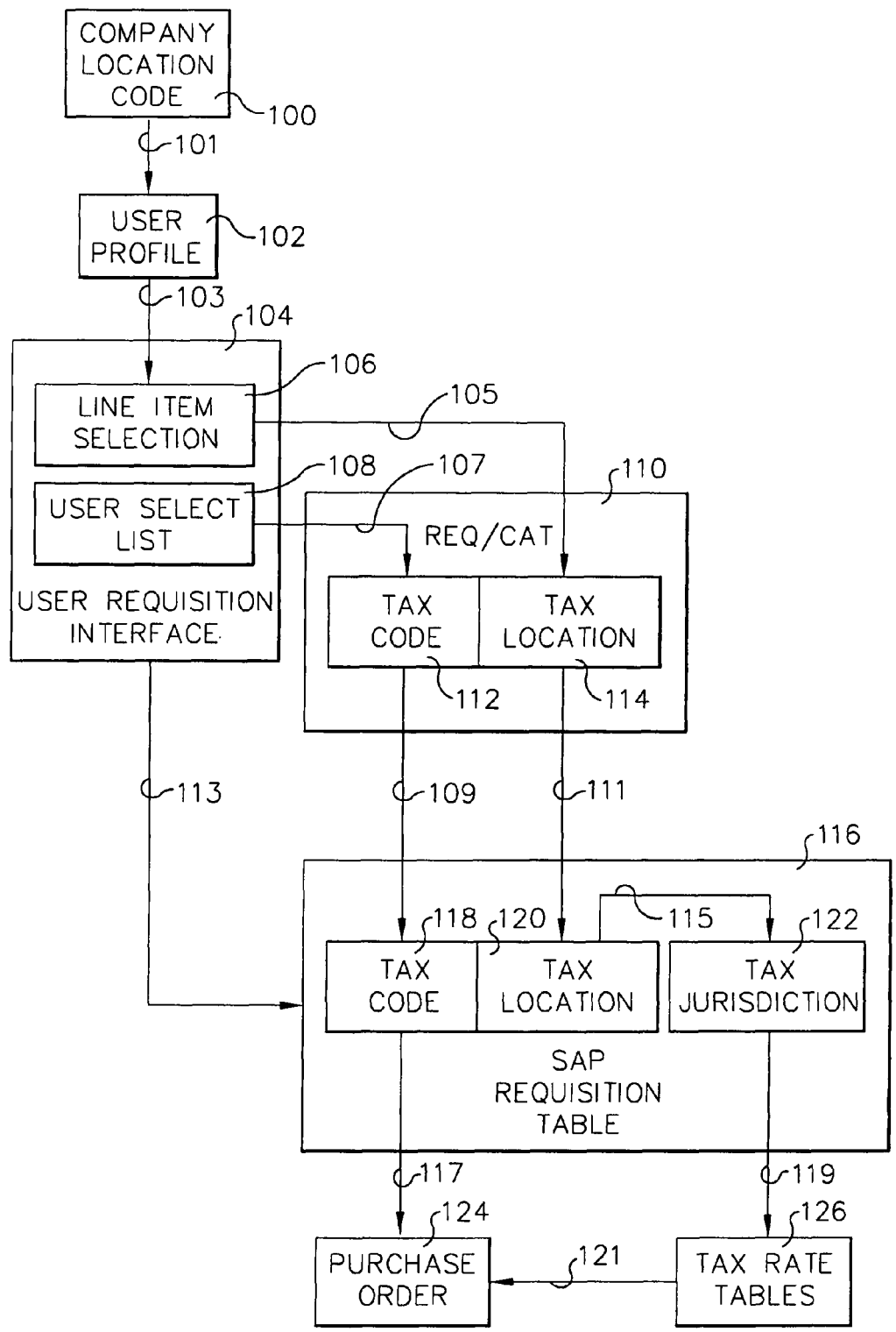
FIG. 2 is schematic representation of a process for preparing taxability for a purchase order in accordance with a scenario applicable to a first company group.

In step 203, users in group A use the tax process shown in FIG. 2. In step 205, users in group B use the tax process of FIG. 4. In step 207, users in group C use the tax process of FIG. 6.

In step 209, a Req/Cat requisition is created.

In step 211, the Req/Cat requisition is bridged to SAP, with the tax code and tax location sent to SAP. The tax location code is converted to a SAP tax jurisdiction code by the bridge. SAP is an acronym (derived from a German language phrase) which refers to an enterprise resource planning system, including an accounting application having an accounts payable function.

In step 213, the SAP requisition is created, and the tax information is stored in a requisition table.

In step 215, the purchase order is created using tax information from the requisition table.

In step 217, the invoice is received from the supplier.

Figure 3:
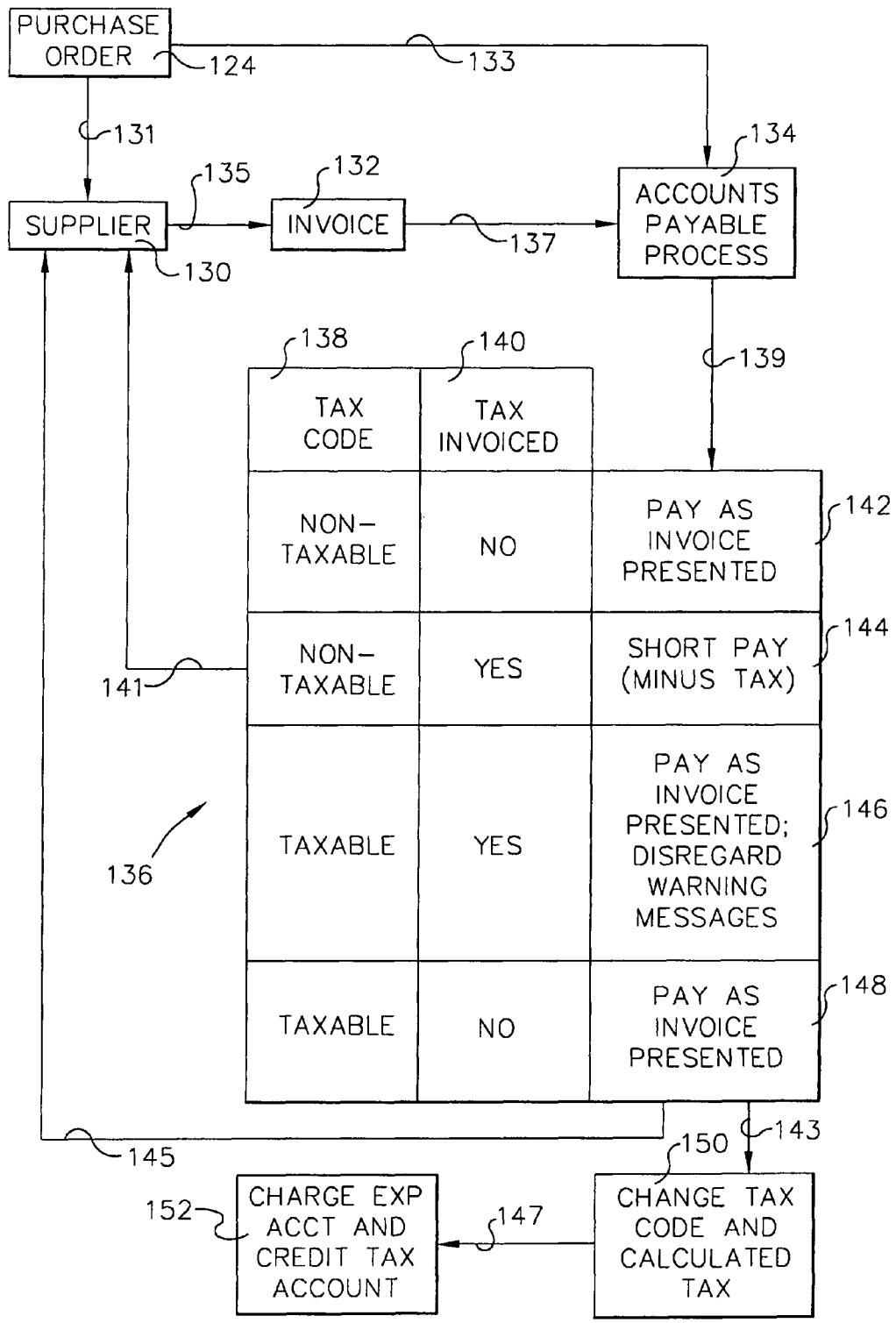
FIG. 3 is a schematic representation of a process for paying invoices for said first company group.
Figure 5:
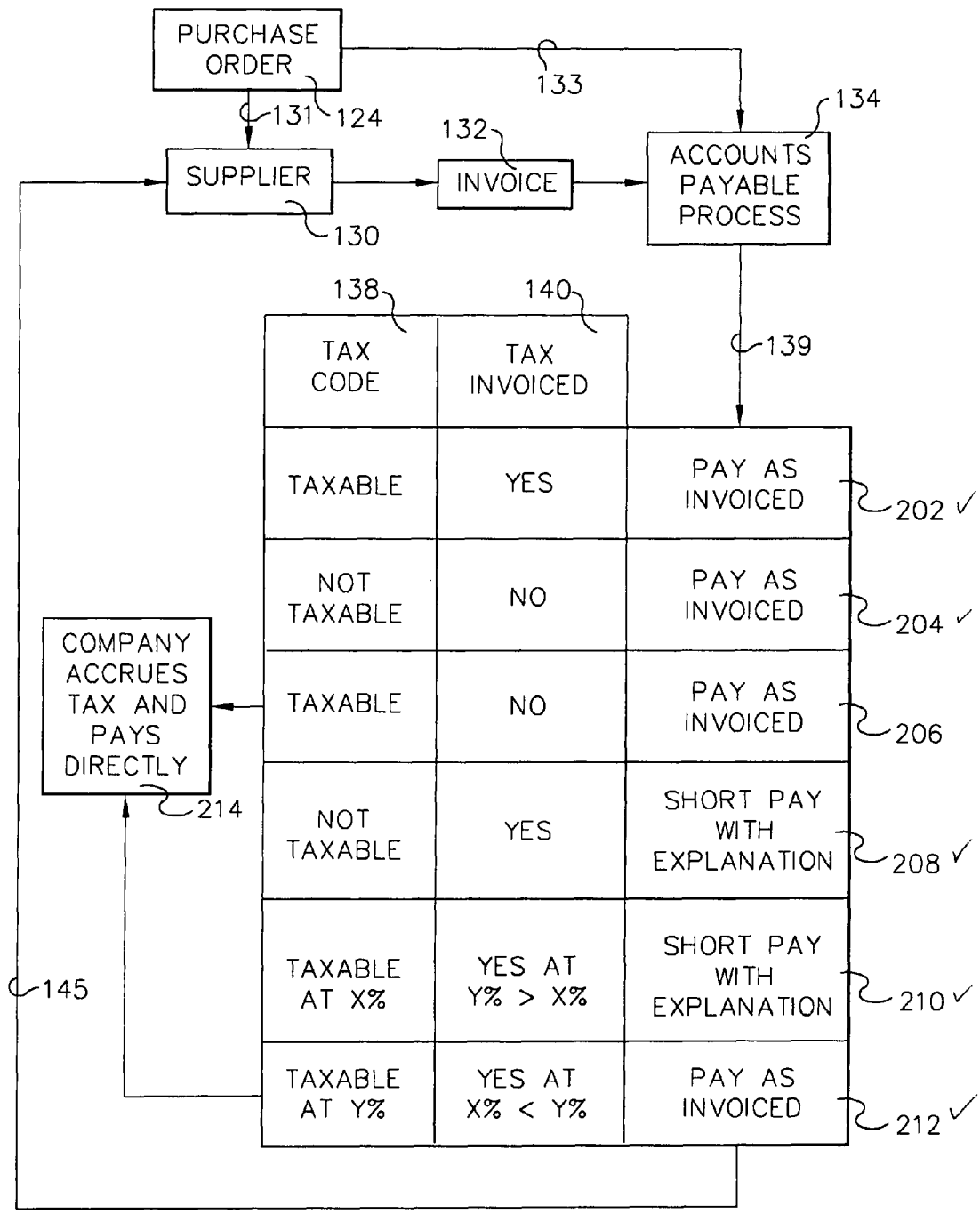
FIG. 5 is a schematic representation of a process for paying invoices for said second company group.
Figure 7:
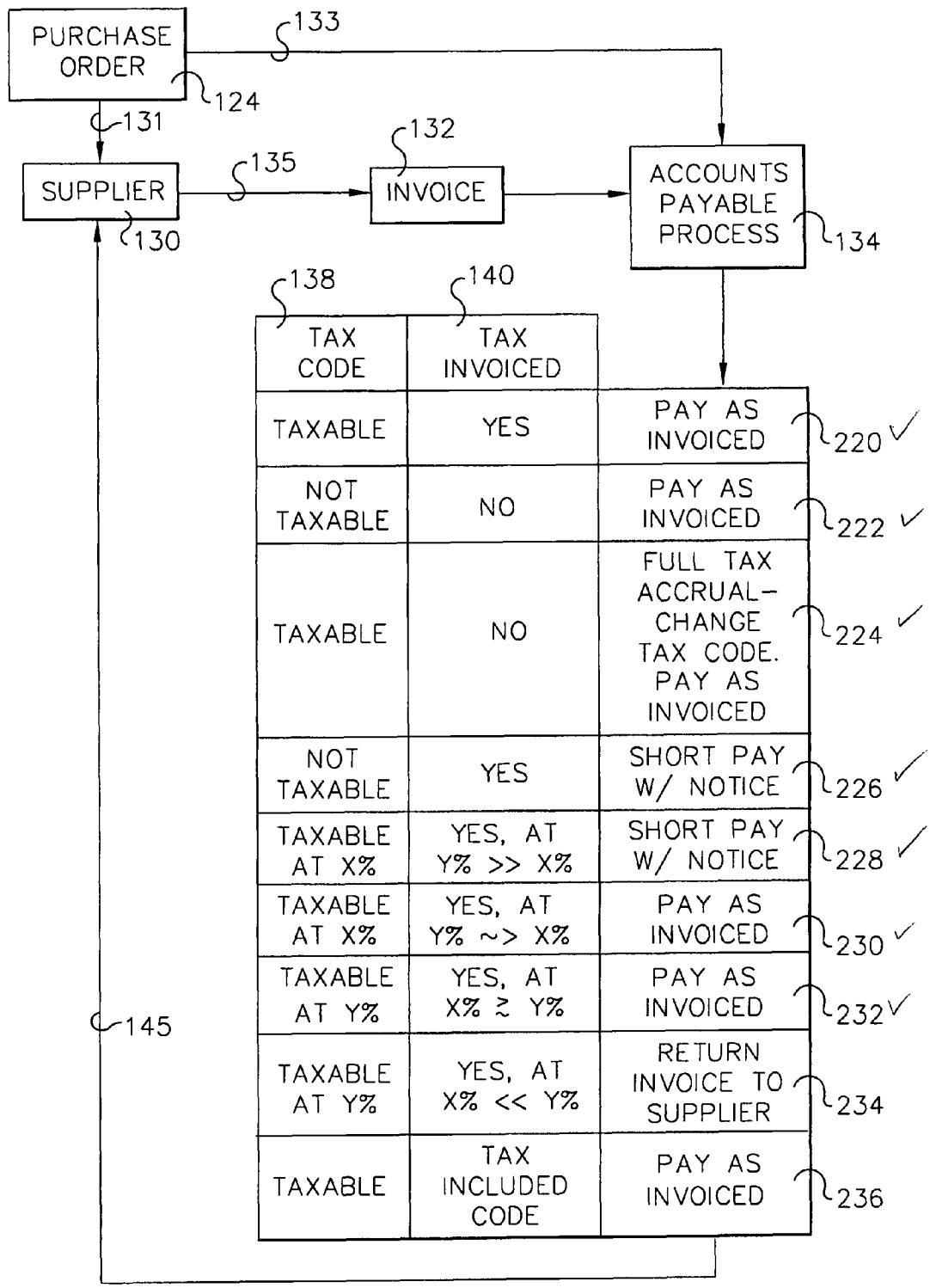
FIG. 7 is a schematic representation of a process for paying invoices for said third company group.

In step 219, invoices for companies in group A are processed as shown in FIG. 3. In step 221, invoices for companies in group B are processed as shown in FIG. 5. In step 223, invoices for companies in group C are processed as shown in FIG. 7.

User profiles contain a default tax location code for the user. This is derived from the user's plant code (a plant has an associated tax location code, based on its address). A user can edit his profile at any time and change this default tax location code.

When a user logs onto the front-end, he is associated with a user profile that has what company group and company he is in. (There is a feed from the HR system with this information, that guarantees the user is in the correct company group, as is more fully described in copending application Ser. No. 09/815,318.) The business logic in the front-end then determines how much information the user must enter for taxes, based on his company group. In some cases; the user sees nothing—the system defaults to a tax code and location. In another company group, the user must select both. And in another, the user doesn't see anything—the tax approver must determine these fields.

FIG. 8 illustrates the display panel presented at the line item level to a user who is required to select tax code and tax location.

FIG. 9 represents the expansion of the "tax indicator code" of FIG. 8.

FIG. 10 illustrates the expansion of the "tax location code" of FIG. 8, and displays the list of tax location codes appropriate for the user's company.

Referring to FIG. 2, in accordance with the first scenario of this exemplary embodiment of the invention, a requester or user at the line item level in Req/Cat 110 determines taxability. There are two fields in Req/Cat 110 to make a tax determination.

First is the tax code field 112. The field tax code 112 defaults with the value "taxable". However, the user may choose a non taxable reason for the purchase from a drop down list 108 with which, as is represented by line 107, to override the default entry to tax code 112. In this embodiment, by way of example, tax codes available for user selection in list 108 include the following:

| | |
|---|---|
| I1 | Taxable |
| N1 | Nontaxable - Resale |
| N2 | Nontaxable - Manufacturing |
| N3 | Nontaxable - Research & Development |
| N4 | Nontaxable - Capital Improvement |
| N5 | Nontaxable - Service |
| N6 | Nontaxable - Other |

Second is the tax location field 114. As is represented by line 103 to line item selection 106 in user requisition interface 104, the field tax code 112 defaults in user profile 102 to the company location code 100. Location code 100 can be changed by user actuation at selection 106 according to the desired point for shipment of the goods, and as represented by line 105 this selection is fed to tax location field 114 in Req/Cat application 110.

The tax code 112 and tax location 114 are fed, as is represented by lines 109 and 111, respectively, to SAP requisition table 116. As is represented by line 115, the tax location field 120 is converted to a SAP tax jurisdiction code field 122. The tax code 118 and tax jurisdiction 122 for a given requisition 113 line in table 116 are used when the purchase order is created from the requisition. The tax code 118 and jurisdiction code 122 combination is maintained in SAP via a FTXP transaction. A periodic update spreadsheet is provide by the company to maintain the tax rates in table 126. A SAP purchase order contains the tax code 118 and tax jurisdiction code 122 as these are determined in Req/Cat 110. The purchase order output 124 contains a tax code 118 description, a jurisdiction code 122 description and the tax rate from table 126 corresponding to tax jurisdiction 122.

The tax code and tax location code from the front-end are passed to the back-end and stored in a table for each requisition line item. The 3-position tax location from the front-end is converted to a 9-digit tax jurisdiction code. For example, tax location 33F in the front-end is converted to tax jurisdiction 33F000000. Each tax code (ie I1, N1, N2 . . . etc) is maintained with each tax jurisdiction (ie 33I000000, 33F000000 . . . ) to arrive at a rate in the back-end. The tax code and tax jurisdiction for the given requisition line is used when the purchase order is created from the requisition. A monthly update spreadsheet is provided by the companies to maintain the rates. The purchase order contains the tax code/tax jurisdiction code as was determined in the front-end. The purchase order output contains the tax code description, the jurisdiction code description and the tax rate.

Referring to FIG. 3, purchase order 124 is sent to supplier 130 who fills the order and, as is represented by line 135, submits an invoice 132 for payment. As is represented by lines 133, 137 and 139, invoice 132 and purchase order 124 are utilized in an accounts payable process 134 and, as is represented by line 145, payment remitted back to supplier 130. The tax code 138 is obtained from purchase order 124, and the tax 140 amount invoiced is obtained from invoice 132 and utilized, as is represented by line 142, to determine processing subsequent to receipt of invoice 132.

At step 142, when purchase order 124 contains a nontaxable code 138 and invoice 132 contains no tax 140, the invoice is paid as presented by the supplier 130.

At step 144, when purchase order 133 contains a nontaxable code 138 and invoice 132 invoices tax 140, the invoice is short paid. That is, the invoiced amount less the tax is paid to the supplier, and as is represented by line 141 the supplier is notified via payment advice text that the invoice is paid short the tax.

At step 146, when purchase order 133 contains a taxable code 138 and invoice 132 contains tax 140, the invoice is paid as presented by supplier 130, and any warning messages from SAP that a different rate or amount was calculated from tax rates table 126 are ignored.

At step 148, when purchase order 133 contains a taxable code 138 and invoice 132 does not contain tax 140, the invoice is paid as presented by supplier 130. As is represented by line 143, the accounts payable representative, in this case, in step 150 will selected in the invoice verification procedure a calculate tax routine (such as by clicking on a tax calculation button in the invoice verification window), changing the tax code to UI in an invoice detail screen. In step 152, SAP will then calculate the tax, charging the expense account and crediting the tax account.

FIG. 11 illustrates a purchase order detail screen which shows tax code I1 which is a taxable code.

Figure 12:
FIG. 12 illustrates a screen showing the tax jurisdiction code.

FIG. 12 illustrates a screen showing the tax jurisdiction code.

FIG. 13 illustrates an invoice verification screen showing a I1 tax code and a tax jurisdiction code of 33I000000 which have defaulted from the purchase order.

Figure 4A:
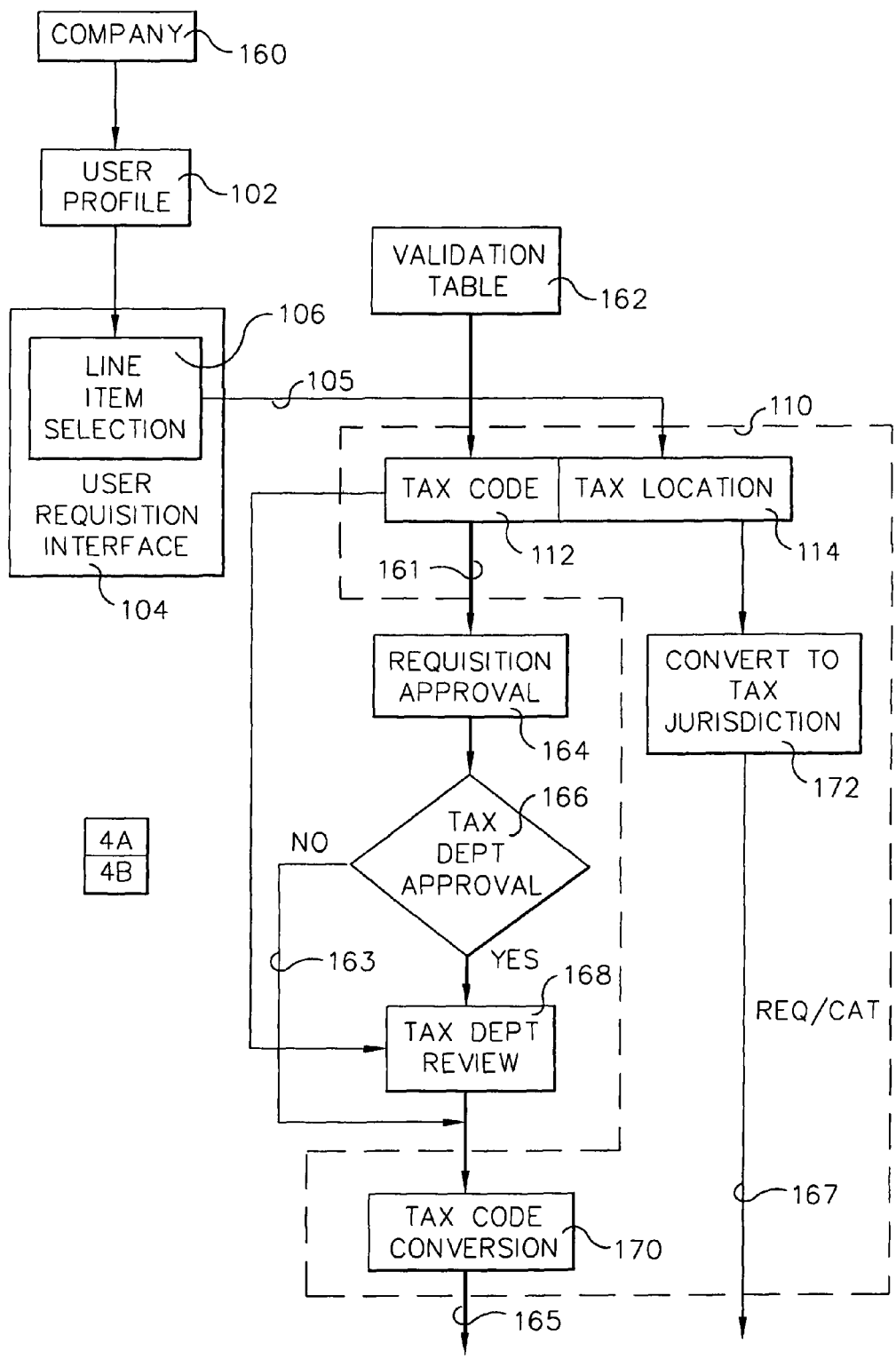
FIG. 4 is a schematic representation of a process for preparing taxability for a purchase order in accordance with a scenario applicable to a second company group.
Figure 4B:
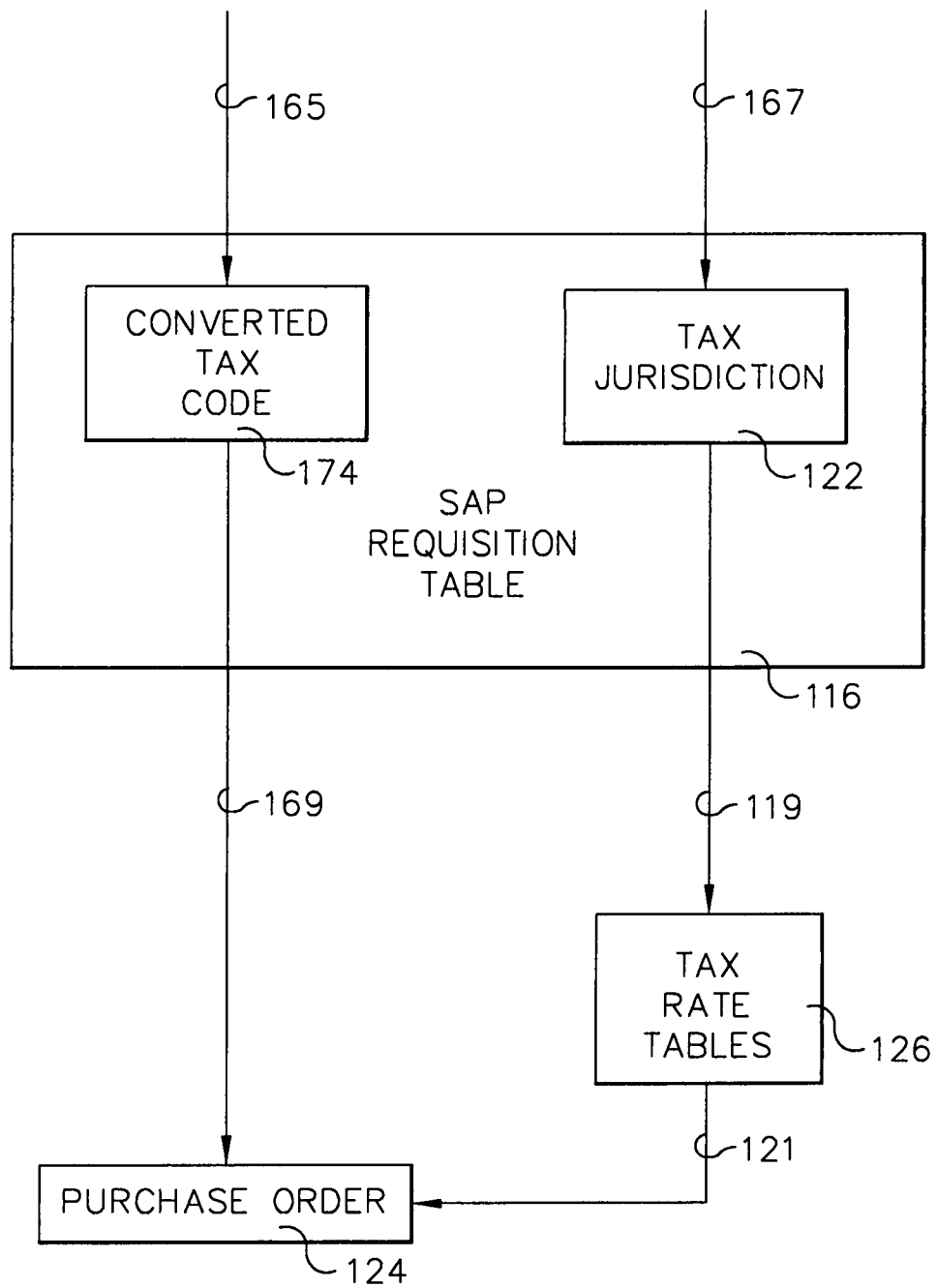

Referring to FIG. 4, in accordance with the second scenario of this exemplary embodiment of the invention, the user (or requester, the individual preparing or requesting preparation of a purchase order) is not involved in tax determination. Rather, tax determination is derived from the general ledger account for the item being purchased, and a tax department review is required for those buys of items for which the tax code 112 is X or blank.

The tax code for each general ledger (G/L) account is maintained in validation table 162 for companies in this company group 160. Tax codes 112 for this scenario are as follows:

| | |
|---|---|
| A | Taxable (other) |
| B | Taxable (repair and replace) |
| C | Taxable (reduced rate) |
| D | Taxable (computer services) |
| N | Not taxable (other) |
| R | Not taxable (resale) |
| X | Either taxable or non taxable |
| " " | (Blank) either taxable or non taxable |

An X or blank means that the tax determination cannot be made automatically. In this case, the requisition is sent for management approval and then held pending a review and determination of the correct tax code by the tax department.

—A user from company 160 has a default tax location entered in his user profile 102 which will be displayed in line item tax location selection field 106 at interface 104 when requesting a purchase. The user may change the value for tax location. As is represented by line 105, the default or user selected tax location is entered to tax location field 114 in Req/Cat 110. However, tax code fields are hidden, or shown as non-changeable, at user requisition interface 104 for users in all companies in company group 160. In the tax department, this tax code is viewable and changeable by the tax approver. —.

Determination of the tax rate for a given object is determined by tax code 112 and tax location 114. Within Req/Cat 110, as is represented by line 167, tax location 114 is converted to tax jurisdiction 122 and stored in requisition table 116. As is represented by line 161, tax code 112 goes through a requisition approval process 164 which, in the event of an X or blank code 112 requires in steps 166 and 168 tax department review and determination of the applicable tax code.

Bridging from Req/Cat 110 to SAP 116 is then done. In step 170, the resulting tax code is converted to a SAP tax code and, as represented by line 165, stored in converted tax code field 174 in requisition table 116. In the event that in step 168 it is determined that the intended supplier is not registered to collect tax, the tax is accrued to the state (tax jurisdiction). Tax code conversion step 170 may be executed with respect to a tax code conversion table, such as is illustrated in Table 1.

TABLE 1

TAX CODE CONVERSION TABLE

| Tax Code 112 | Converted Tax Code 174 | Description |
|---|---|---|
| A | A1 | Taxable - Other |
| B | B1 | Taxable - Repair & Replace |
| C | C1 | Taxable - Reduced Rate |
| D | D1 | Taxable - Computer Services |
| E | E2 | Taxable |
| F | F1 | Taxable |
| G | G1 | Taxable |
| H | H1 | Taxable |
| N | E1 | Non Taxable - Other |
| R | S1 | Non Taxable - Resale (may be out of scope) |

Note:
if X or "" (blank) code, then fail in SAP.

As is represented by lines 119, 121 and 169, the purchase order 124 is created by line item from converted tax code 174, tax jurisdiction 122, and tax rate tables 126. An example output purchase order 124 may read: "I1 Taxable, Item subject to Tax CT—Connecticut 6%".

Referring to FIG. 5, for this second tax processing scenario, accounts payable process 134 will pay invoice 132 as provided by supplier 130 in step 202 when tax code 138 is taxable and tax is invoiced, in step 204 when tax code 138 is not taxable and no tax is invoiced, in step 206 when tax code 138 is taxable and no tax is invoiced, and in step 212 when tax code 138 indicates a tax rate less than the rate invoiced. In step 214, the company accrues and pays the tax directly. Accounts payable process 134 will short pay the invoice when, in step 208, tax code 138 is not taxable and tax is invoiced, and in step 210 when tax code 138 indicates that the tax rate is less than the tax invoiced 140.

Figure 6:
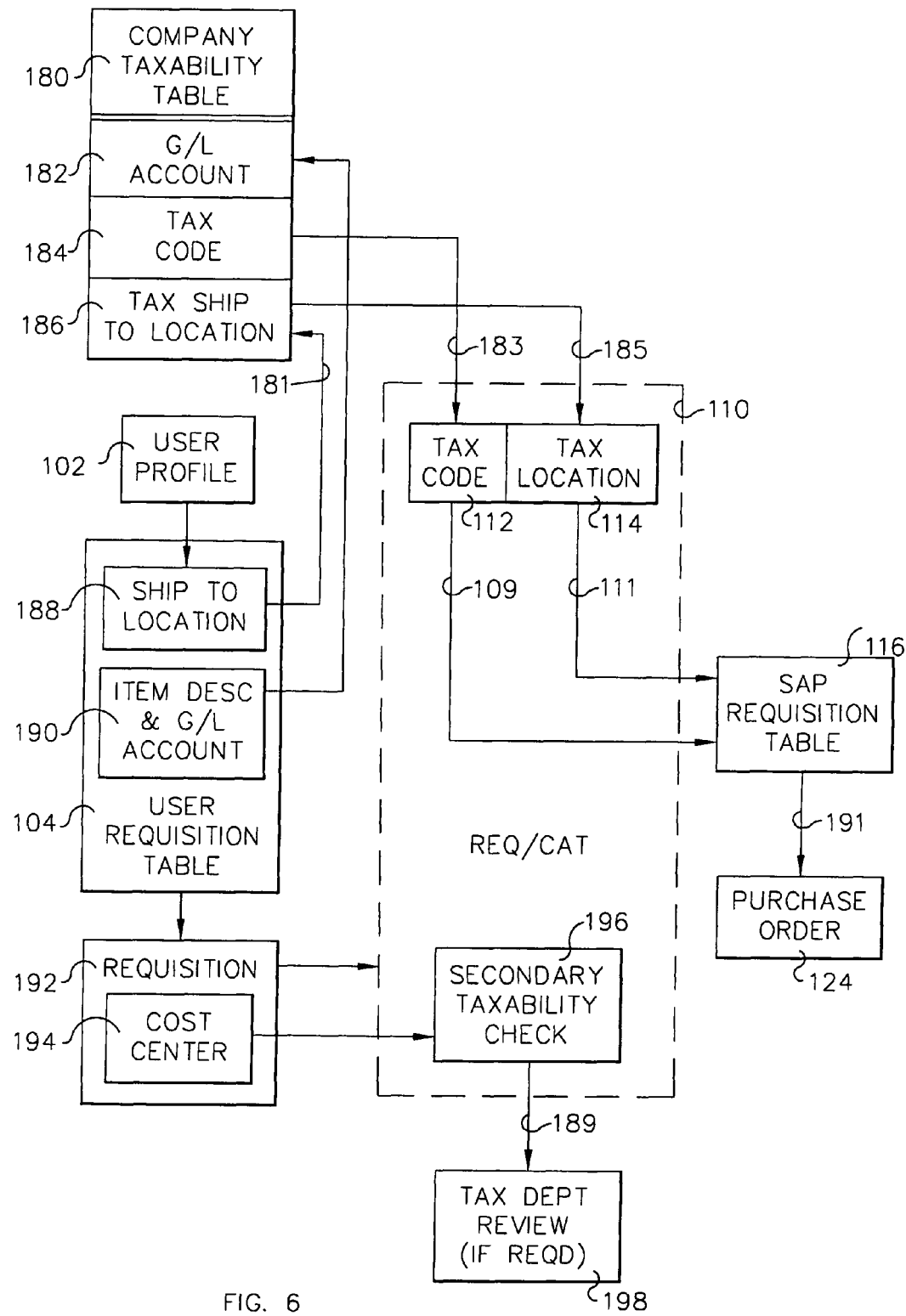
FIG. 6 is schematic representation of a process for preparing taxability for a purchase order in accordance with a scenario applicable to a third company group.

Referring to FIG. 6, in accordance with the third scenario of this exemplary embodiment of the invention, tax determination is made with reference to the commodity being purchased and the purchasing location (that is, the ship to location). In this process, the tax code is derived based on the general ledger account for the commodity or service being purchased, and the requester is allowed to enter the tax location code. The combination of tax code and tax location is then validated, and the cost center being charged is verified as a taxable cost center.

A company taxability table 180 is maintained for all companies in this company group which includes, for each general ledger account 182, the appropriate tax code 184 and tax ship to location 186. Table 2 illustrates a sample primary taxability table 180.

TABLE 2

SAMPLE COMPANY GROUP TAXABILITY TABLE 180

| G/L Account 182 | Tax Location CT1 | Tax Location CT2 |
|---|---|---|
| 021500000 | A1 | E1 |
| 017400000 | B1 | AB |

In this example, when a purchase is made using G/L account 021500000 and the requestor's tax ship to location is CT2, then the tax code E1 and tax location CT2 would be populated to Req/Cat 110 field 112 and 114, respectively. The combination of this tax code 184 and tax location 186 drive the taxability of the requisition line item 192. The tax code of AB in Table 2 represents that the taxable other code is applicable but other factors could make the purchase non-taxable. In that case, a secondary taxability check 196 needs to be performed.

In the example of Table 2, the tax codes 184 used for each tax location 186 code are as follows:

| A1 | Taxable - Other |
| AB | Could be either non taxable or taxable |
| B1 | Taxable - Repair and replace |
| BB | Could be either non taxable or taxable |
| C1 | Taxable - Reduced rate |
| CB | Could be either non taxable or taxable |
| D1 | Taxable - Computer services |
| DB | Could be either non taxable or taxable |
| E1 | Non taxable - Other |
| S1 | Non taxable - Resale |
| T1 | Tax included |
| "" | Route to tax approver to have tax code assigned |

When condition *B is encountered in primary taxability table 180, secondary check routine 196 is Req/Cat 110 will need to look at the cost center type 194 (also derived from table 180) to determine taxability.

User requisition interface 104 is initialized with a default ship to location from user profile 102 in field 188, which the user may accept or change. As is represented by lines 181 and 185, the tax ship to location selected or accepted is fed to Req/Cat 110 tax location field 114. At user requisition interface 104, the user selects from an item description and general ledger account pull down panel 190, the general ledger account number 182 for the desired purchase, and this is used to access table 180 to obtain the corresponding tax code which is then fed, as is represented by line 183, to tax code field 112 in Req/Cat 110. As in the preceding scenarios, tax code 112 and tax location 114 are converted and fed to requisition table 116, from which purchase order 124 is created.

A secondary taxability check is provided in this scenario to further define taxability. When the tax code 184 found in primary taxability table 180 ends with a B, for example, routine 196 determines taxability from the cost center type 194 contained in the requisition line item.

Referring to FIG. 7, for this third scenario, accounts payable process 134 executes with respect to invoice 132 received from supplier 130 against purchase order 124 as follows. The invoice 132 is paid as invoiced when, in step 220 it is determined that tax code 138 from purchase order 124 is taxable and tax 140 is invoiced; in step 222 when tax code 138 is not taxable and tax 140 is not invoiced; in steps 230 and 232 when tax code 138 indicates a tax rate which is within tolerance of the tax 140 invoiced; and in step 236 when tax code 138 is taxable and invoice 132 includes a tax included code 140. In step 224, when tax code 138 is taxable and no tax 140 is invoiced, the invoice is paid as provided by the supplier but the full tax amount is accrued. In step 226, when tax code 138 is not taxable and tax 140 is invoiced, or in step 228 when the tax 140 invoiced is more than a tolerance amount over the tax code 138, the invoice is short paid (that is, paid at the invoiced total amount less the tax or tax discrepancy, respectively). In step 234, the invoice is returned unpaid to the supplier 130 when tax 140 invoiced exceeds by some tolerance that rate applicable to tax code 138.

Advantages Over The Prior Art

It is an advantage of the invention that there is provided an improved system and method for processing tax payments.

It is a further advantage of the invention that there is provided a system and method for assigning taxability codes to purchases by company groups, and to automatically adapt to those company groups the processing of tax payments.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We Claim:

1. A method for assigning taxability codes to purchases and processing tax invoices, said method comprising:

determining, for a line item pertaining to purchase of a commodity or service for a user identified in a user profile to a first company group of a plurality of company groups, a first tax location and a first tax code of a plurality of tax codes, said determining the first tax location and the first tax code comprising using a process specific to the first company group that differs from another process that must be used if the first user were identified to a different company group of the plurality of company groups, each tax code denoting the line item as being taxable, being non-taxable, or having undetermined taxability;

a computer generating a second tax code of the plurality of tax codes from the first tax code;

ascertaining a tax jurisdiction from the tax location;

after said generating the second tax code and said ascertaining the tax jurisdiction, said computer creating a requisition table comprising the second tax code, the tax location, and the tax jurisdiction;

after said creating the requisition table, ascertaining for the line item a tax rate based on the second tax code and the tax location;

after said ascertaining the tax rate, said computer generating a purchase order, said generating the purchase order comprising inserting the ascertained tax rate into the purchase order and transferring both the second tax code and the tax jurisdiction from the requisition table to the purchase order;

transmitting the purchase order to a supplier of the line item;

in response to said transmitting the purchase order to the supplier, receiving from the supplier an invoice specifying a payment due for the purchase order; and responding to the invoice by paying to the supplier a portion of the payment due or not paying to the supplier any portion of the payment due, said responding being in dependence on tax parameters comprising the second tax code and a tax indication of whether or not the payment due specified by the invoice includes a tax due to the tax jurisdiction for the line item.

2. The method of claim 1, wherein the used process is a first process, a second process, or a third process;

wherein said using the first process comprises: said user selecting the first tax code from a list of tax codes and determining the first user location either by using a location code comprised by the user profile or by the user selecting the tax location from a list of tax locations;

wherein said using the second process comprises: determining the first tax code as being specific to a general ledger account for companies in the first company group and determining the first user location either by using a location code comprised by the user profile or by the user selecting the tax location from a list of tax locations;

wherein said using the third process comprises: determining the first tax code as being specific to a general ledger account for the commodity or service and determining the first user location by using a destination location for the commodity or service.

3. The method of claim 2, wherein the method further comprises ascertaining which tax indicators of multiple tax indicators the tax parameters comprise;

wherein if the used process is the first process then the multiple tax indicators consist of first tax indicators, second tax indicators, third tax indicators, and fourth tax indicators;

wherein if the used process is the second process then the multiple tax indicators consist of the first tax indicators, the second tax indicators, the third tax indicators, the fourth tax indicators, fifth tax indicators, and sixth tax indicators;

wherein if the used process is the third process then the multiple tax indicators consist of the first tax indicators, the second tax indicators, the third tax indicators, the fourth tax indicators, the fifth tax indicators, the sixth tax indicators, seventh tax indicators, eighth tax indicators, ninth tax indicators, and tenth tax indicators;

wherein the first tax indicators comprise the second tax code denoting the line item taxable and the tax indication of the payment due specified by the invoice including the tax;

wherein the second tax indicators comprise the second tax code denoting the line item not taxable and the tax indication of the payment due specified by the invoice not including the tax;

wherein the third tax indicators comprise the second tax code denoting the line item taxable and the tax indication of the payment due specified by the invoice not including the tax;

wherein the fourth tax indicators comprise the second tax code denoting the line item not taxable and the tax indication of the payment due specified by the invoice including the tax;

wherein the fifth tax indicators comprise the second tax code denoting the line item taxable at X% and the tax due indication of the payment due specified by the invoice including the tax at Y% such that Y%>X%;

wherein the sixth tax indicators comprise the second tax code denoting the line item taxable at Y% and the tax due indication of the payment due specified by the invoice including the tax at X% such that X%<Y%;

wherein the seventh tax indicators comprise the second tax code denoting the line item taxable at X% and the tax due indication of the payment due specified by the invoice including the tax at Y% such that Y%>>X%;

wherein the eighth tax indicators comprise the second tax code denoting the line item taxable at X% and the tax due indication of the payment due specified by the invoice including the tax at Y% such that Y%~>X%;

wherein the ninth tax indicators comprise the second tax code denoting the line item taxable at Y% and the tax due indication of the payment due specified by the invoice including the tax at X% such that X%≳Y%;

wherein the tenth tax indicators comprise the second tax code denoting the line item taxable at Y% and the tax due indication of the payment due specified by the invoice including the tax at X% such that X%<<Y%.

4. The method of claim 3, wherein if the used process is the first process, the second process, or the third process and if said ascertaining ascertains that the tax parameters comprise the first tax indicators, the second tax indicators, or the third tax indicators then said responding to the invoice comprises paying to the supplier the payment due;

wherein if the used process is the first process, the second process, or the third process and if said ascertaining ascertains that the tax parameters comprise the fourth tax indicators then said responding to the invoice comprises paying to the supplier the payment due less the tax included in the payment due specified by the invoice;

wherein if the used process is the second process and if said ascertaining ascertains that the tax parameters comprise the fifth tax indicators, then said responding to the invoice comprises paying to the supplier the payment due less a difference between the tax at Y% and the tax at X%;

wherein if the used process is the second process and if said ascertaining ascertains that the tax parameters comprise the sixth tax indicators, then said responding to the invoice comprises paying to the supplier the payment due;

wherein if the used process is the third process and if said ascertaining ascertains that the tax parameters comprise the seventh tax indicators, then said responding to the invoice comprises paying to the supplier the payment due less a difference between the tax at Y% and the tax at X%;

wherein if the used process is the third process and if said ascertaining ascertains that the tax parameters comprise the eighth tax indicators or the ninth tax indicators, then said responding to the invoice comprises paying to the supplier the payment due;

wherein if the used process is the third process and if said ascertaining ascertains that the tax parameters comprise the tenth tax indicators, then said responding to the invoice comprises not paying to the supplier any portion of the payment due and the method further comprises returning the invoice to the supplier.

5. The method of claim 4, wherein the used process is the first process.

6. The method of claim 4, wherein the used process is the second process.

7. The method of claim 4, wherein the used process is the third process.

8. The method of claim 2, wherein the used process is the second process, and wherein the method further comprises:

before said generating the second tax code, determining that the first tax code denotes the line item as having undetermined taxability; and responsive to said determining that the first tax code denotes the line item as having undetermined taxability, a tax department transforming the first tax code to another first tax code denoting the line item as being taxable or non-taxable.

9. The method of claim 2, wherein the used process is the first process or the second process, wherein if the used process is the first process then said using the first process comprises determining the first user location by using the location code comprised by the user profile, and wherein if the used process is the second process then said using the second process comprises determining the first user location by using the location code comprised by the user profile.

10. The method of claim 2, wherein the used process is the first process or the second process, wherein if the used process is the first process then said using the first process comprises the user selecting the tax location from the list of tax locations, and wherein if the used process is the second process then said using the second process comprises the user selecting the tax location from the list of tax locations.

11. A computer program product, comprising:

a physically tangible computer readable storage medium storing a computer readable program code, said program code configured to be executed by a computer to perform a method for assigning taxability codes to purchases and processing tax invoices, said method comprising:

determining, for a line item pertaining to purchase of a commodity or service for a user identified in a user profile to a first company group of a plurality of company groups, a first tax location and a first tax code of a plurality of tax codes, said determining the first tax location and the first tax code comprising using a process specific to the first company group that differs from another process that must be used if the first user were identified to a different company group of the plurality of company groups, each tax code denoting the line item as being taxable, being non-taxable, or having undetermined taxability;

generating a second tax code of the plurality of tax codes from the first tax code;

ascertaining a tax jurisdiction from the tax location;

after said generating the second tax code and said ascertaining the tax jurisdiction, creating a requisition table comprising the second tax code, the tax location, and the tax jurisdiction;

after said creating the requisition table, ascertaining for the line item a tax rate based on the second tax code and the tax location;

after said ascertaining the tax rate, generating a purchase order, said generating the purchase order comprising inserting the ascertained tax rate into the purchase order and transferring both the second tax code and the tax jurisdiction from the requisition table to the purchase order;

transmitting the purchase order to a supplier of the line item;

in response to said transmitting the purchase order to the supplier, receiving from the supplier an invoice specifying a payment due for the purchase order; and responding to the invoice by paying to the supplier a portion of the payment due or not paying to the supplier any portion of the payment due, said responding being in dependence on tax parameters comprising the second tax code and a tax indication of whether or not the payment due specified by the invoice includes a tax due to the tax jurisdiction for the line item.

12. The computer program product of claim 11, wherein the used process is a first process, a second process, or a third process;

wherein said using the first process comprises: said user selecting the first tax code from a list of tax codes and determining the first user location either by using a location code comprised by the user profile or by the user selecting the tax location from a list of tax locations;

wherein said using the second process comprises: determining the first tax code as being specific to a general ledger account for companies in the first company group and determining the first user location either by using a location code comprised by the user profile or by the user selecting the tax location from a list of tax locations;

wherein said using the third process comprises: determining the first tax code as being specific to a general ledger account for the commodity or service and determining the first user location by using a destination location for the commodity or service.

13. The computer program product of claim 12, wherein the method further comprises ascertaining which tax indicators of multiple tax indicators the tax parameters comprise;

wherein if the used process is the first process then the multiple tax indicators consist of first tax indicators, second tax indicators, third tax indicators, and fourth tax indicators;

wherein if the used process is the second process then the multiple tax indicators consist of the first tax indicators, the second tax indicators, the third tax indicators, the fourth tax indicators, fifth tax indicators, and sixth tax indicators;

wherein if the used process is the third process then the multiple tax indicators consist of the first tax indicators, the second tax indicators, the third tax indicators, the fourth tax indicators, the fifth tax indicators, the sixth tax indicators, seventh tax indicators, eighth tax indicators, ninth tax indicators, and tenth tax indicators;

wherein the first tax indicators comprise the second tax code denoting the line item taxable and the tax indication of the payment due specified by the invoice including the tax;

wherein the second tax indicators comprise the second tax code denoting the line item not taxable and the tax indication of the payment due specified by the invoice not including the tax;

wherein the third tax indicators comprise the second tax code denoting the line item taxable and the tax indication of the payment due specified by the invoice not including the tax;

wherein the fourth tax indicators comprise the second tax code denoting the line item not taxable and the tax indication of the payment due specified by the invoice including the tax;

wherein the fifth tax indicators comprise the second tax code denoting the line item taxable at X% and the tax due indication of the payment due specified by the invoice including the tax at Y% such that Y%>X%;

wherein the sixth tax indicators comprise the second tax code denoting the line item taxable at Y% and the tax due indication of the payment due specified by the invoice including the tax at X% such that X%<Y%;

wherein the seventh tax indicators comprise the second tax code denoting the line item taxable at X% and the tax due indication of the payment due specified by the invoice including the tax at Y% such that Y%>>X%;

wherein the eighth tax indicators comprise the second tax code denoting the line item taxable at X% and the tax due indication of the payment due specified by the invoice including the tax at Y% such that Y%~>X%;

wherein the ninth tax indicators comprise the second tax code denoting the line item taxable at Y% and the tax due indication of the payment due specified by the invoice including the tax at X% such that X%≳Y%;

wherein the tenth tax indicators comprise the second tax code denoting the line item taxable at Y% and the tax due indication of the payment due specified by the invoice including the tax at X% such that X%<<Y%.

14. The computer program product of claim 13, wherein if the used process is the first process, the second process, or the third process and if said ascertaining ascertains that the tax parameters comprise the first tax indicators, the second tax indicators, or the third tax indicators then said responding to the invoice comprises paying to the supplier the payment due;

wherein if the used process is the first process, the second process, or the third process and if said ascertaining ascertains that the tax parameters comprise the fourth tax indicators then said responding to the invoice comprises paying to the supplier the payment due less the tax included in the payment due specified by the invoice;

wherein if the used process is the second process and if said ascertaining ascertains that the tax parameters comprise the fifth tax indicators, then said responding to the invoice comprises paying to the supplier the payment due less a difference between the tax at Y% and the tax at X%;

wherein if the used process is the second process and if said ascertaining ascertains that the tax parameters comprise the sixth tax indicators, then said responding to the invoice comprises paying to the supplier the payment due;

wherein if the used process is the third process and if said ascertaining ascertains that the tax parameters comprise the seventh tax indicators, then said responding to the invoice comprises paying to the supplier the payment due less a difference between the tax at Y% and the tax at X%;

wherein if the used process is the third process and if said ascertaining ascertains that the tax parameters comprise the eighth tax indicators or the ninth tax indicators, then said responding to the invoice comprises paying to the supplier the payment due;

wherein if the used process is the third process and if said ascertaining ascertains that the tax parameters comprise the tenth tax indicators, then said responding to the invoice comprises not paying to the supplier any portion of the payment due and the method further comprises returning the invoice to the supplier.

15. The computer program product of claim 14, wherein the used process is the first process.

16. The computer program product of claim 14, wherein the used process is the second process.

17. The computer program product of claim 14, wherein the used process is the third process.

18. A system, comprising:
    a computer; and
    a physically tangible computer readable storage medium storing a computer readable program code, said computer configured to execute the program code to perform a method for assigning taxability codes to purchases and processing tax invoices, said method comprising:
        determining, for a line item pertaining to purchase of a commodity or service for a user identified in a user profile to a first company group of a plurality of company groups, a first tax location and a first tax code of a plurality of tax codes, said determining the first tax location and the first tax code comprising using a process specific to the first company group that differs from another process that must be used if the first user were identified to a different company group of the plurality of company groups, each tax code denoting the line item as being taxable, being non-taxable, or having undetermined taxability;
        generating a second tax code of the plurality of tax codes from the first tax code;
ascertaining a tax jurisdiction from the tax location;
        after said generating the second tax code and said ascertaining the tax jurisdiction, creating a requisition table comprising the second tax code, the tax location, and the tax jurisdiction;
        after said creating the requisition table, ascertaining for the line item a tax rate based on the second tax code and the tax location;
        after said ascertaining the tax rate, generating a purchase order, said generating the purchase order comprising inserting the ascertained tax rate into the purchase order and transferring both the second tax code and the tax jurisdiction from the requisition table to the purchase order;
        transmitting the purchase order to a supplier of the line item;
        in response to said transmitting the purchase order to the supplier, receiving from the supplier an invoice specifying a payment due for the purchase order; and
        responding to the invoice by paying to the supplier a portion of the payment due or not paying to the supplier any portion of the payment due, said responding being in dependence on tax parameters comprising the second tax code and a tax indication of whether or not the payment due specified by the invoice includes a tax due to the tax jurisdiction for the line item.

19. The system of claim 18,
    wherein the used process is a first process, a second process, or a third process;
    wherein said using the first process comprises: said user selecting the first tax code from a list of tax codes and determining the first user location either by using a location code comprised by the user profile or by the user selecting the tax location from a list of tax locations;
    wherein said using the second process comprises: determining the first tax code as being specific to a general ledger account for companies in the first company group and determining the first user location either by using a location code comprised by the user profile or by the user selecting the tax location from a list of tax locations;
    wherein said using the third process comprises: determining the first tax code as being specific to a general ledger account for the commodity or service and determining the first user location by using a destination location for the commodity or service.

20. The system of claim 19,
    wherein the method further comprises ascertaining which tax indicators of multiple tax indicators the tax parameters comprise;
    wherein if the used process is the first process then the multiple tax indicators consist of first tax indicators, second tax indicators, third tax indicators, and fourth tax indicators;
    wherein if the used process is the second process then the multiple tax indicators consist of the first tax indicators, the second tax indicators, the third tax indicators, the fourth tax indicators, fifth tax indicators, and sixth tax indicators;
    wherein if the used process is the third process then the multiple tax indicators consist of the first tax indicators, the second tax indicators, the third tax indicators, the fourth tax indicators, the fifth tax indicators, the sixth tax indicators, seventh tax indicators, eighth tax indicators, ninth tax indicators, and tenth tax indicators;
    wherein the first tax indicators comprise the second tax code denoting the line item taxable and the tax indication of the payment due specified by the invoice including the tax;
    wherein the second tax indicators comprise the second tax code denoting the line item not taxable and the tax indication of the payment due specified by the invoice not including the tax;
    wherein the third tax indicators comprise the second tax code denoting the line item taxable and the tax indication of the payment due specified by the invoice not including the tax;
    wherein the fourth tax indicators comprise the second tax code denoting the line item not taxable and the tax indication of the payment due specified by the invoice including the tax;
    wherein the fifth tax indicators comprise the second tax code denoting the line item taxable at X% and the tax due indication of the payment due specified by the invoice including the tax at Y% such that Y%>X%;
    wherein the sixth tax indicators comprise the second tax code denoting the line item taxable at Y% and the tax due indication of the payment due specified by the invoice including the tax at X% such that X%<Y%;
    wherein the seventh tax indicators comprise the second tax code denoting the line item taxable at X% and the tax due indication of the payment due specified by the invoice including the tax at Y% such that Y%>>X%;
    wherein the eighth tax indicators comprise the second tax code denoting the line item taxable at X% and the tax due indication of the payment due specified by the invoice including the tax at Y% such that Y%~>X%;
    wherein the ninth tax indicators comprise the second tax code denoting the line item taxable at Y% and the tax due indication of the payment due specified by the invoice including the tax at X% such that X%≳Y%;

wherein the tenth tax indicators comprise the second tax code denoting the line item taxable at Y% and the tax due indication of the payment due specified by the invoice including the tax at X% such that X%<<Y%.

21. The system of claim 20, wherein if the used process is the first process, the second process, or the third process and if said ascertaining ascertains that the tax parameters comprise the first tax indicators, the second tax indicators, or the third tax indicators then said responding to the invoice comprises paying to the supplier the payment due;

wherein if the used process is the first process, the second process, or the third process and if said ascertaining ascertains that the tax parameters comprise the fourth tax indicators then said responding to the invoice comprises paying to the supplier the payment due less the tax included in the payment due specified by the invoice;

wherein if the used process is the second process and if said ascertaining ascertains that the tax parameters comprise the fifth tax indicators, then said responding to the invoice comprises paying to the supplier the payment due less a difference between the tax at Y% and the tax at X%;

wherein if the used process is the second process and if said ascertaining ascertains that the tax parameters comprise the sixth tax indicators, then said responding to the invoice comprises paying to the supplier the payment due;

wherein if the used process is the third process and if said ascertaining ascertains that the tax parameters comprise the seventh tax indicators, then said responding to the invoice comprises paying to the supplier the payment due less a difference between the tax at Y% and the tax at X%;

wherein if the used process is the third process and if said ascertaining ascertains that the tax parameters comprise the eighth tax indicators or the ninth tax indicators, then said responding to the invoice comprises paying to the supplier the payment due;

wherein if the used process is the third process and if said ascertaining ascertains that the tax parameters comprise the tenth tax indicators, then said responding to the invoice comprises not paying to the supplier any portion of the payment due and the method further comprises returning the invoice to the supplier.

22. The system of claim 19, wherein the used process is the first process.

23. The system of claim 19, wherein the used process is the second process.

24. The system of claim 19, wherein the used process is the third process.

* * * * *